（12）United States Patent
Coates, III et al.

(10) Patent No.: US 6,192,934 B1
(45) Date of Patent: Feb. 27, 2001

(54) BREAK-AWAY CONCENTRIC HOSE COUPLING

(75) Inventors: Gordon R. Coates, III, Augusta; Thomas O. Mitchell, Maryland Heights; Arthur C. Fink, Jr., Lonedell, all of MO (US)

(73) Assignee: Husky Corporation, Pacific, MO (US)

( * ) Notice: Subject to any disclaimer, the term of this patent is extended or adjusted under 35 U.S.C. 154(b) by 0 days.

(21) Appl. No.: 09/567,594

(22) Filed: May 10, 2000

Related U.S. Application Data

(60) Provisional application No. 60/133,417, filed on May 11, 1999.

(51) Int. Cl.[7] .................................................... F16L 37/28
(52) U.S. Cl. ............................ 137/614.04; 137/614.05; 137/68.14
(58) Field of Search ..................... 137/614.03, 614.04, 137/614.05, 68.14, 68.15

(56) References Cited

U.S. PATENT DOCUMENTS

| 5,365,973 | * | 11/1994 | Fink, Jr. et al. | ............ 137/614.05 X |
| 5,570,719 | * | 11/1996 | Richards et al. | ................ 137/614.04 |
| 5,615,706 | * | 4/1997 | Guertin | ............................ 137/614.04 |
| 5,699,822 | * | 12/1997 | Bodhaine | ..................... 137/614.04 X |

\* cited by examiner

Primary Examiner—Kevin Lee
(74) Attorney, Agent, or Firm—Paul M. Denk

(57) ABSTRACT

A vapor recovery breakaway hose coupling for use in conjunction with a vapor recovery nozzle and for application within a fuel line, that prevents untimely decoupling, that incorporates a secondary seal that is located between the fuel and vapor passages to maintain clean o-ring sealing and sliding surfaces by preventing fuel and/or contaminates from contracting the primary fuel to vapor o-ring when the valve is in a non-emergency situation, an interference bump is incorporated which imparts a shock to the fuel check valve during separation and unbalanced check valve springs that maintains a static seal to reduce o-ring fretting, and primary fuel to vapor o-ring relocation.

4 Claims, 1 Drawing Sheet

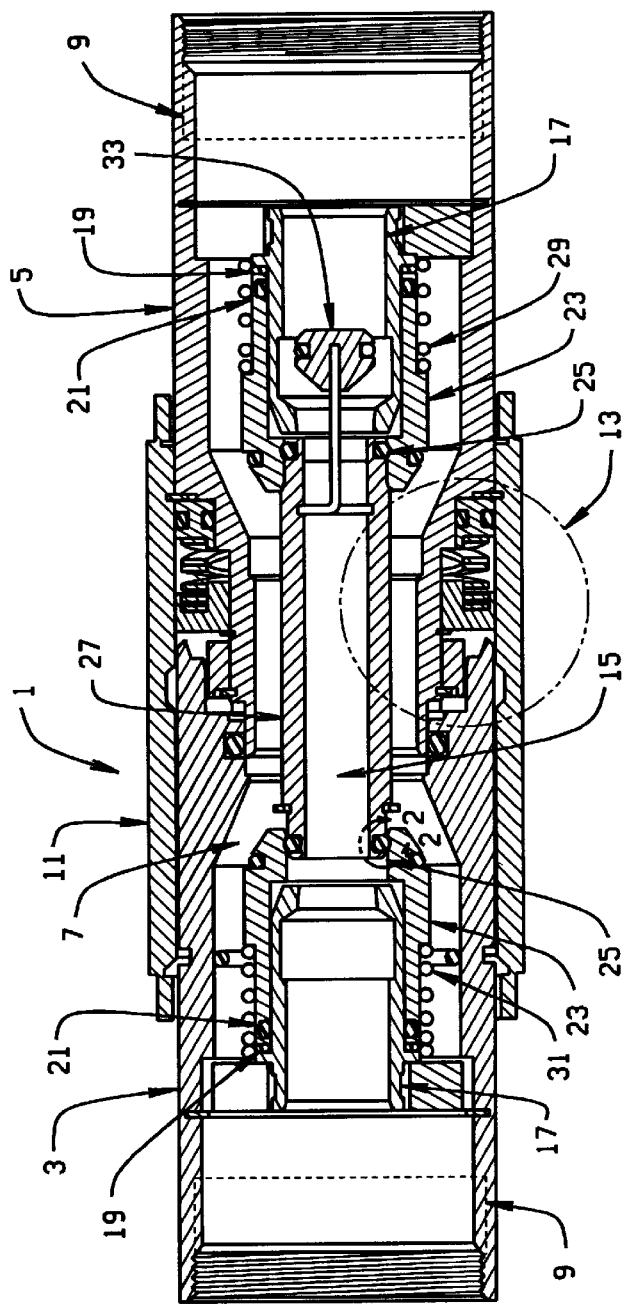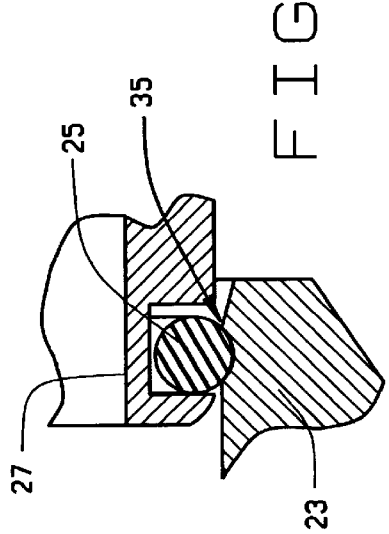

BREAK-AWAY CONCENTRIC HOSE COUPLING

CROSS-REFERENCE TO RELATED APPLICATIONS

This application is based on provision application Ser. No. 60/133,417 filed May 11, 1999.

BACKGROUND OF THE INVENTION

This invention relates to breakaway coupling for use with gasoline dispensing equipment.

Emergency breakaway valves came about due to equipment damage that occurred when a customer drove off with the gasoline dispensing nozzle in his tank. The original emergency breakaway couplings were fairly simple in design. However, eventually, vapor recovery was mandated, and emergency breakaway couplings compatible with various vapor recovery systems were needed.

Vapor recovery systems incorporate the use of two hoses or flow paths: one for fuel delivery and the other for vapor return; either as side-by-side flow paths or in coax configurations. Thus, emergency breakaway valves were developed to be used with these different systems and hoses. The emergency breakaway valves that were developed for use with coax vapor hoses require that fuel and vapor paths be separated. The valve is constructed such that the vapor path is contained by the inner hose and the fuel path is defined by the outer hose. When this emergency breakaway valve separates, the fuel valve moves relative to the vapor passage cylinder during closing. In current instances contaminants would build up on or behind the primary fuel to vapor o-ring, which could potentially create a wedging action and cause the valve to close slowly or prevent closure of the check valves. Either of these conditions allows excess fuel to spill and create a potential hazard.

BRIEF SUMMARY OF THE INVENTION

This invention relates to a coax style emergency breakaway valve in a breakaway coupling, and more specifically concerns the redesign of fuel to vapor path sealing and the fuel valve mechanism. A secondary fuel to vapor seal prevents fuel contaminates from contacting the primary fuel to vapor o-ring to inhibit the build-up of contaminates behind the primary o-ring. As noted above, the build-up of contaminates behind the primary O-ring is a main factor in causing slow or failure of closure on the fuel valve. The valve mechanism is designed to provide a closure force, in addition to the valve springs, to the main fuel valve to initiate valve closure during separation. This additional force comes from the initial force that separates the hose coupling. The unbalanced valve springs assure the fuel to vapor O-ring remains static which eliminates seal fretting. The primary fuel to vapor O-ring relocation is such that the volume between it and the secondary seal is minimized to significantly reduce the amount of contaminates and during relative movement this O-ring moves away from the contaminates to eliminate the wedging action seen in previous designs.

The principal object of this invention is to provide for a greater seal in the various valves during separation of the identified coupling through preventing of the buildup of contaminates in proximity of the various seals provided within the same.

Another object of this invention provides for a supplemental force that provides greater sealing of the breakaway coupling during separation.

Still another object of this invention is to provide a breakaway hose coupling that is designed to prevent untimely decoupling during usage.

Another object of this invention is to provide for supplemental seals that locate between fuel and vapor passages to maintain the cleanliness of its sealing and prevent the buildup of contaminates within the system.

These and other objects may become more apparent to those skilled in the art upon reviewing the summary of this invention, and upon undertaking a study of the description of its preferred embodiment, in view of the drawings.

BRIEF DESCRIPTION OF THE DRAWINGS

FIG. 1 provides a cross-sectional view of the emergency coax breakaway valve assembly or coupling of this invention; and FIG. 2 is an enlarged fragmentary view taken along the circle 2—2 of FIG. 1.

DESCRIPTION OF THE PREFERRED EMBODIMENT

An emergency coax breakaway valve 1 is shown in full cross section in the drawing. This coax breakaway valve 1 is made of a male subassembly half 3 and female subassembly half 5. The two subassembly halves are generally cylindrical in shape and define a fuel path 7.

Each of the halves are threaded at their ends, as at 9, to allow connection of the two halves to flexible coax hoses. The assembly halves 3 and 5 are held together by an outer sleeve 11 and the latching/separation mechanism 13, by which the female subassembly 5 remains with the sleeve 11 during separation.

The subassembly halves also define a vapor path 15 which is coaxially arranged with the fuel path 7. Thus, the fuel path is annular in cross-section and the vapor path 15 is circular in cross section. Each half 3 and 5 includes a cylindrical part 17 adjacent the threads 9, a secondary seal 19 near the outer end of the cylindrical part 17, a relocated primary O-ring 21 forward of the secondary seal 19, a fuel valve 23, and an O-ring 25 in the valve 23. A tubular part 27 extends between the valves 23 of each half. As can be seen, the vapor path 15 is defined by the cylindrical parts 17, the valves 23, and the tubular part 27. The O-rings 19, 21, and 25 seal the connections between the different parts to form a seal to prevent cross leakage between the vapor path 15 and the fuel path 7.

The vapor path 15 is held in place by the male 3 and female 5 subassemblies, but it is biased in one direction by the use of unbalanced springs. A stronger spring 29 is used with the female half 5 while a weaker spring 31 is used in the male half 3. That is, the spring 29 is stronger than the spring 31. There is also a vapor valve 33 located in the vapor path15 which seals off the vapor path when the two halves are separated from each other.

As can be further noted, each fuel valve 23 includes an interference bump 35 which provides a means for the O-ring 25 to pull against during separation and to provide additional closing force on the fuel valve 23 in addition to the force provided by springs 29 and 31. The valves 23 also contain the relocated primary O-ring 21 which is located such that when the fuel valve 23 closes it moves away from secondary seal 19 and slides along the cylindrical part 19 which is only exposed to the vapor path 15. The secondary seal 19 is located between the fuel valve 23 and the cylindrical part 17 and is held in place by compression. The location of the secondary seal 19 also prevents contaminates in the fuel passage 1 from contacting the primary O-ring 21. Thus, contaminates cannot build up by the primary O-ring 21 to impede the closing of the valves.

Variations or modifications to the subject matter at hand may occur to those skilled in the art upon reviewing the subject matter. If variations or modifications are within the spirit of the invention, such changes are intended to be within the scope of the invention.

Having described the invention what is claimed and desired to the secured Letters Patent is:

1. A breakaway hose coupling adapted to be mounted in a flexible fuel line between the fuel source and a fuel dispensing nozzle of the type that allows fuel flow therethrough during usage but capable of disconnecting and shutting off the flow through the line when subject to excessive tensioning force exerted on the line comprising:

a first fitting of generally cylindrically shape connectable to said nozzle or one section of fuel line leading to a nozzle;

a second fitting of generally cylindrically shape connectable to the other section of fuel line;

said first and second fittings forming a fuel flow path therein and an inner disposed concentric vapor return path;

said first and second fitting each having a check valve, said valves being opposed to each other, one of said valves having an extension therewith, and disposed for engaging the other valve during coupling to hold said valves unseated from their respective valve seats to allow fuel and vapors to flow through the coupling, and disposed to retract and allow said valves to seat on their respective valve seats thereby shutting off flow through the coupling when the coupling is severed;

said fuel check valves including a primary seal and a secondary seal; said secondary seal being positioned to substantially prevent contaminates from building up around the primary seal.

2. The breakaway coupling of claim I wherein said fuel check valves include an interference bump at the intersection of the check valves and the extension to provides a shock to said fuel check valves when the coupling separates to aid in closure of the fuel check valves.

3. The breakaway coupling of claim 1 wherein said fuel check valves are biased in one direction to reduce movement of the passage due to fuel flow and to substantially eliminate deterioration of the primary seal due to such movement.

4. The breakaway coupling of claim 3 wherein the first fitting includes a first spring and the second fitting includes a second spring; the second spring being stronger than the first spring.

* * * * *